(12) United States Patent
Kruglick

(10) Patent No.: US 8,537,110 B2
(45) Date of Patent: Sep. 17, 2013

(54) VIRTUAL DEVICE BUTTONS

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 818 days.

(21) Appl. No.: 12/508,831

(22) Filed: Jul. 24, 2009

(65) Prior Publication Data
US 2011/0018814 A1    Jan. 27, 2011

(51) Int. Cl.
*G09G 5/08* (2006.01)

(52) U.S. Cl.
USPC .............................. 345/158; 463/37; 715/864

(58) Field of Classification Search
USPC ........... 345/156, 157, 158, 173, 184; 463/37; 715/863, 864
See application file for complete search history.

(56) References Cited

U.S. PATENT DOCUMENTS

| | | | | |
|---|---|---|---|---|
| 6,297,838 | B1 * | 10/2001 | Chang et al. | 715/863 |
| 6,369,794 | B1 * | 4/2002 | Sakurai et al. | 345/156 |
| 6,861,946 | B2 | 3/2005 | Verplaetse | |
| 8,125,312 | B2 * | 2/2012 | Orr | 340/5.31 |
| 2002/0167699 | A1 * | 11/2002 | Verplaetse et al. | 359/158 |
| 2006/0097983 | A1 * | 5/2006 | Haggman et al. | 345/156 |
| 2007/0070046 | A1 * | 3/2007 | Sheynblat et al. | 345/173 |
| 2007/0247434 | A1 | 10/2007 | Cradick et al. | |
| 2010/0088061 | A1 * | 4/2010 | Horodezky et al. | 702/141 |

OTHER PUBLICATIONS

E.J.J Kruglick, B.A. Warneke, K.S.J Pister, CMOS 3-Axis Accelerometers with Integrated Amplifier, Proceedings SPIE 11th Annual International Workshop on Micro Electro Mechanical Systems, pp. 631-636, Jan. 25-29, 1998.

Brett Warneke, Eric Hoffman, Kristofer S.J. Pister, Monolithic Multiple Axis Accelerometer Design in Standard CMOS, 1995 Symposium on Micromachining and Microfabrication in Standard CMOS, pp. 95-102, Oct. 23, 1995, Austin, TX, USA.

Steven Nasiri, A Critical Review of MEMS Gyroscopes Technology and Commercialization Status, InvenSense, http://www.invensense.com/shared/pdf/MEMSGyroComp.pdf, accessed Jul. 17, 2009.

Ellzey, Curtis, "Inertial Sensors and Accelerometers," Penton Media, Inc., 2012, pp. 1-2, http://engeeniringtv.com/blogs/etv/archive/2008/05/28/inertial-sensors-and-accelerometres.aspx.

* cited by examiner

*Primary Examiner* — Tom Sheng

(57) ABSTRACT

Various implementations of virtual device button simulation are disclosed.

55 Claims, 8 Drawing Sheets

VIRTUAL DEVICE BUTTONS

BACKGROUND

User interfaces for consumer electronics devices commonly employ physical buttons to allow a user to control device functions. For example, a cell phone may have dozens of buttons distributed in various locations around the device to allow a user to answer calls, navigate through operating system menus, etc. Some devices may also permit a user to control a device by tilting or shaking it. In such devices, motion induced by the user may be sensed using accelerometer integrated circuits (ICs) and particular motions may then be correlated with device functions. However, motions such as tilting, shaking, etc. may interfere with the user's enjoyment of the device by, for example, interrupting viewing of a device's display, contributing to a user's repetitive motion injuries, etc.

Some products may also allow a user to interact with a device by tapping it. For example, an accelerometer IC may be employed to distinguish the act of a user tapping a device's case from other events such as the user tapping the device's physical keys.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
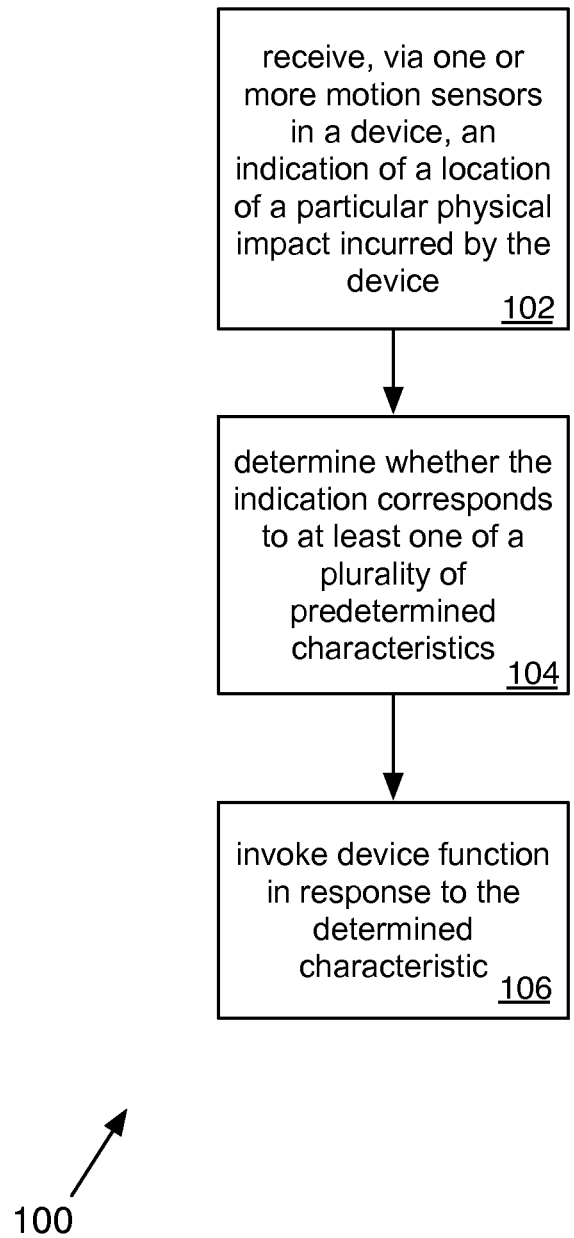
FIG. 1 is a flow chart illustrating an example process for providing virtual device buttons.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm may generally be considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions or operations of a computing platform, such as a computer or a similar electronic computing device such as a cellular telephone, that manipulates and/or transforms data represented as physical quantities including electronic and/or magnetic quantities within the computing platform's processors, memories, registers, etc.

This disclosure is drawn, inter alia, to methods, apparatus, and systems related to the simulation of virtual device buttons.

In accordance with the present disclosure, signals derived from a physical impact delivered to the exterior of a device, by, for example, tapping the exterior of a device's case with a finger or a stylus, may be used to establish the location of the impact and to correlate the impact location with a device function. For example, in accordance with the disclosure, a tap delivered to one portion of the case of a cellular telephone may be used to invoke a device function such as scrolling displayed text downward, while a tap delivered to another portion of the case may be used to invoke a different device function such as scrolling the displayed text upward.

In accordance with the present disclosure, two or more 3-axis accelerometers or motion sensors may be employed within a device in order to determine a torque applied to the device when a physical impact such as a tap occurs at a location on the device. For example, by measuring differences in timing and/or amplitude of signals originating at the impact location, motion sensors may be used to determine the impact's location. In some other examples, a single 6-axis accelerometer (e.g., a gyroscopic motion sensor) may be employed within a device in order to determine torsional motion of the device in response to a physical impact such as a tap occurring at various locations on the device.

In addition, in accordance with the present disclosure, resonant structures that respond to an impact by resonating at a particular frequency or at a particular range of frequencies may be incorporated into some example devices. Various signals received from the motion of these resonant structures at one or more motion sensors may be used to determine to the location of the physical impact and to correlate the impact location with a device function.

FIG. 1 is a flow chart illustrating an example process 100 for the simulation of virtual device buttons in accordance with the present disclosure. Process 100, and other processes described herein, set forth various functional blocks that may be described as processing steps, functional operations, events and/or acts, etc., and that may be performed by hardware, software or any combination thereof. Those skilled in the art in light of the present disclosure will recognize that numerous alternatives to the functional blocks shown in FIG. 1, and other processes described herein, may be practiced in accordance with claimed subject matter.

Process 100 may include one or more of blocks 102, 104, and/or 106. In block 102, process 100 may include receiving, via one or more motion sensors in a device, an indication of a location of a particular physical impact incurred by the device. In block 104, a determination may be made as to whether the indication received in block 102 corresponds with at least one of a plurality of predetermined characteristics. If the indication corresponds to a predetermined characteristic, then, in block 106, a device function may be invoked in response to the determined characteristic.

Figure 2:
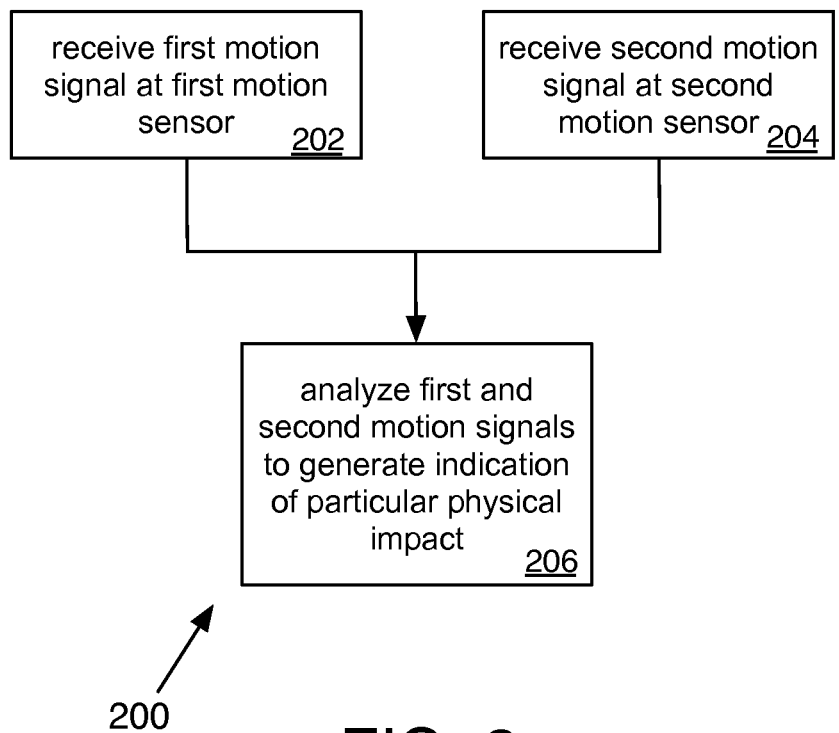
FIG. 2 is a flow chart illustrating another example process for providing virtual device buttons.

FIG. 2 is a flow chart illustrating an example process 200 for the simulation of virtual device buttons in accordance with the present disclosure. In some implementations, process 200 may be implemented in undertaking blocks 102 and/or 104 of process 100. Those skilled in the art in light of the present disclosure will recognize that numerous alternatives to the functional blocks shown in FIG. 2, and other processes described herein, may be practiced in accordance with claimed subject matter.

Process 200 may include one or more of blocks 202, 204 and/or 206. In block 202, process 200 may include receiving a first motion signal at a first motion sensor of a device. In block 204, process 200 may include receiving a second motion signal at a second motion sensor of a device. In block 206, the first and second motion signals received in blocks 202 and/or 204 may be analyzed to generate an indication of a particular physical impact incurred by a device. In some implementations, as will be described further below, a device, such as a cellular telephone, computer peripheral, etc., incorporating two or more accelerometers or "3-axis" motion sensors may undertake processes 100 and/or 200. Blocks 202 and/or 204 may be performed either sequentially or in parallel with one another.

Figure 3:
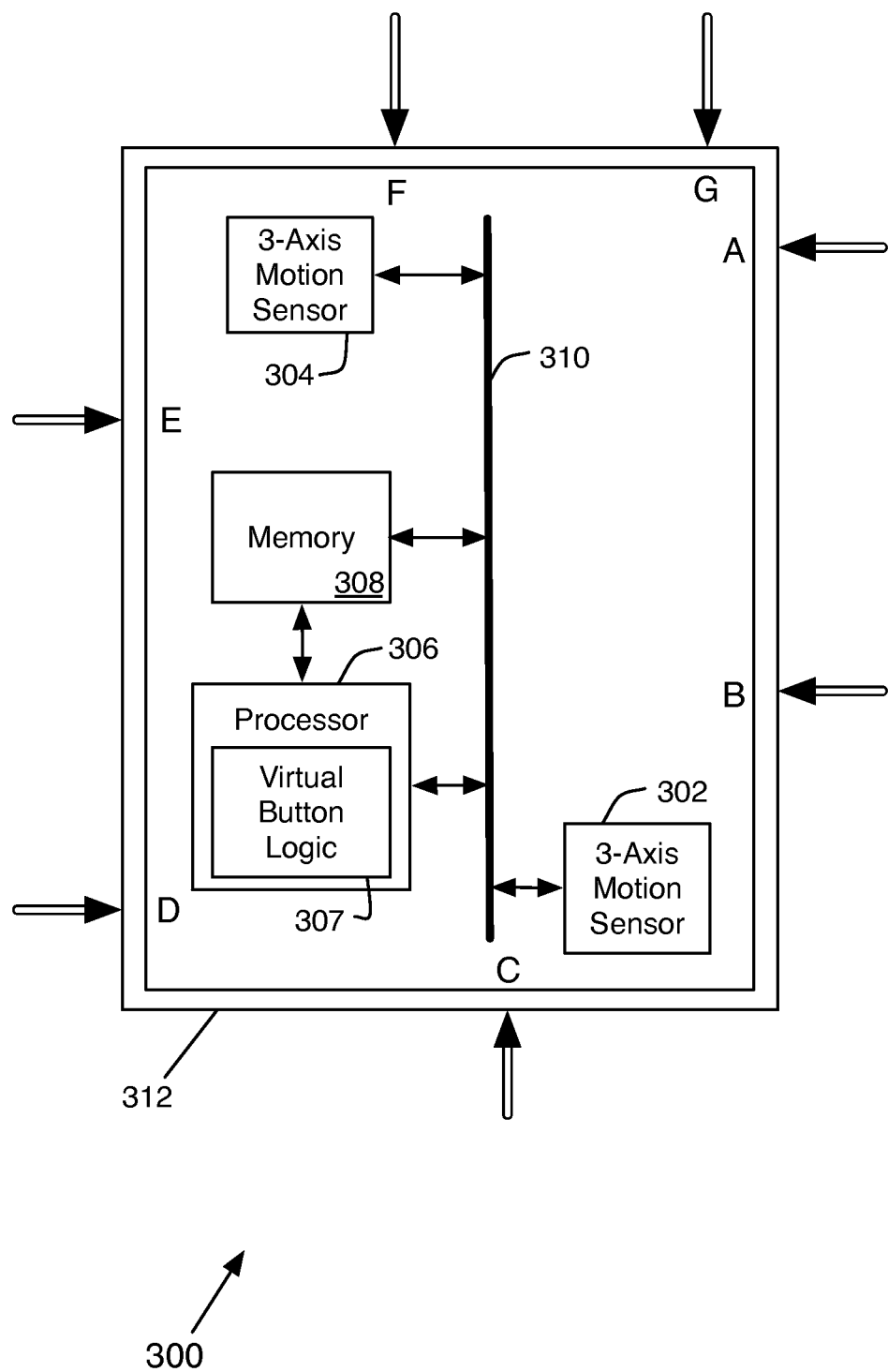
FIG. 3 is block diagram illustrating an example system that may be suitable for providing virtual device buttons.

FIG. 3 is a block diagram illustrating an example system or device 300 suitable for undertaking any one or all functional blocks of processes 100 and/or 200 in accordance with the present disclosure. Device 300 is presented herein as an example device useful for explaining the subject matter of processes 100 and 200, and claimed subject matter is not limited to the particular configuration of components illustrated in FIG. 3. Device 300 may include a pair of 3-axis motion sensors (e.g., accelerometers) 302 and 304 coupled to a processor 306 and a memory 308 via a bus 310. Processor 306 and memory 308 may also be arranged to communicate directly with each other without using bus 310. Similarly, although not shown in FIG. 3, components 302-308 may be arranged to communicate with each other without the use of a communications bus such as bus 310.

Device 300 also may include a case 312 enclosing components 302-310 within device 300. In various implementations, device 300 may be a communications device such as a cellular telephone, a Personal Digital Assistant (PDA), etc., or may be a device such as portable game console, a navigational aid (e.g., a Global Positioning System (GPS) device), a portable computing device such as a laptop or tablet computer, a computer peripheral device such as a computer mouse, etc. Those of skill in the art, in light of the present disclosure, will appreciate how a 3-axis motion sensor may be configured and how such a sensor may be used to detect motion of the sensor, or a device to which it is attached, with respect to the three physical translation axes of space. Further, while device 300 illustrates discrete components 302-310, claimed subject matter is not limited in this regard and those of skill in the art, in light of the present disclosure will recognize that one or more of components 302-310 may be integrated into a single component, such as a System On a Chip (SOC) Integrated Circuit (IC).

Figure 4A:
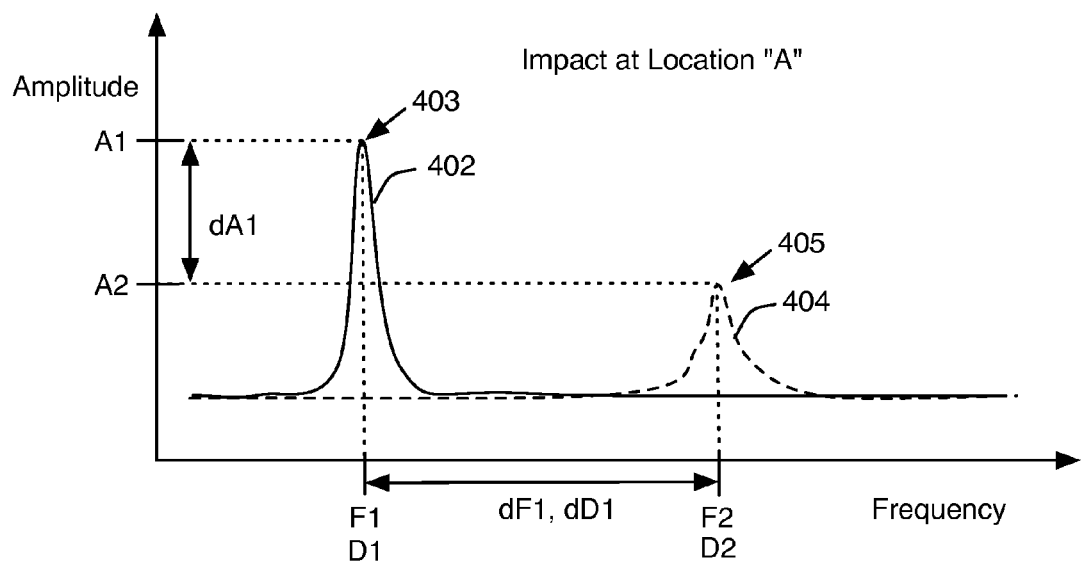
FIGS. 4A and 4B illustrate hypothetical motion signals.
Figure 4B:
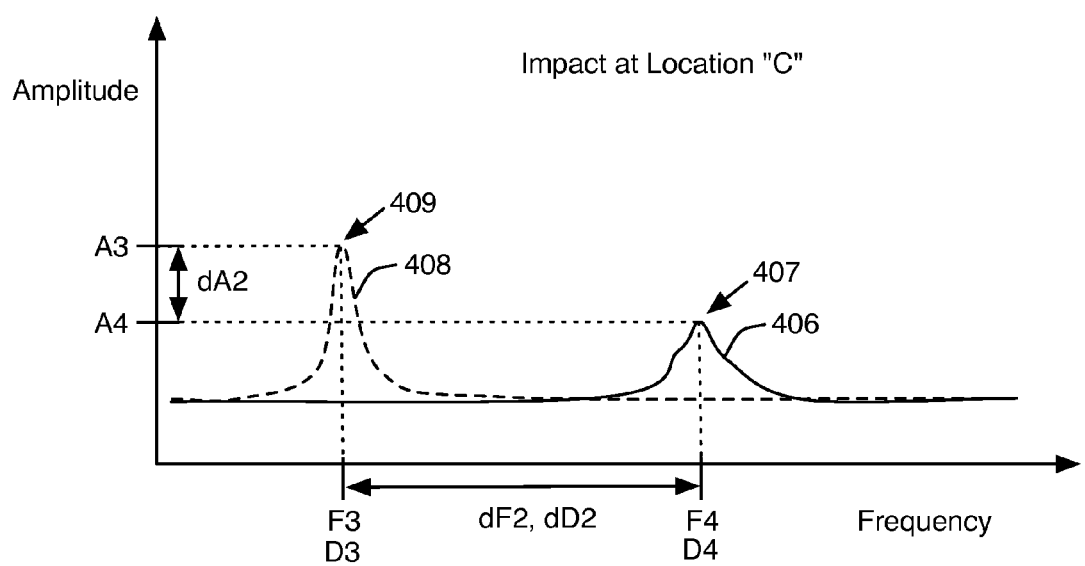

In accordance with the present disclosure, a physical impact applied to device 300 at any one of example locations A-G shown in FIG. 3 on case 312 may generate motion signals that may be received by sensors 302 and 304. It should be noted that locations A-G illustrated in FIG. 3 are provided purely for illustrative purposes and are not intended to limit claimed subject matter in any way. FIGS. 4A and 4B are diagrams illustrating hypothetical motion signals with respect to one physical axis that may be received by sensors 302 and 304 in response to physical impacts incurred by device 300 at example locations A and C respectively.

In the example of FIG. 4A, a physical impact, such as a tap provided by a finger or stylus, occurring at location A may generate a motion signal 402 (solid line) received at sensor 304 where signal 402 may be indicative of torque along one physical axis of device 300. In comparison, the impact at location A may generate another motion signal 404 (dashed line) received at sensor 302 where signal 404 may also be indicative of the torque applied to device 300 by the same impact at location A that generated motion signal 402 at sensor 304.

As shown in FIG. 4A, motion signal 402 may include a signal peak 403 having amplitude A1 occurring at a frequency F1, while signal 404 may include a signal peak 405 having an amplitude A2 occurring at a frequency F2. In accordance with the present disclosure, by analyzing signals 402 and/or 404, for example, by comparing signal peak 403 to signal peak 405, location A may be associated with the impact that generated signals 402 and/or 404. For example, in accordance with some implementations, signals 402 and/or 404 may be analyzed by Virtual Button logic 307 of processor 306 to generate a differential amplitude value dA1, equal to (A1−A2), between the amplitudes of peaks 403 and 405 and/or a differential frequency value dF1, equal to (F2−F1), between the frequencies of peaks 403 and 405 that may be used to identify location A.

Similarly, in the example of FIG. 4B, an impact occurring at location C may generate a motion signal 406 (solid line) received at sensor 304 where signal 406 may be indicative of torque applied to device 300 by the impact. In comparison, the impact at location C may generate a motion signal 408 (dashed line) received at sensor 302 where signal 408 may also be indicative of the torque applied to device 400 by the same impact at location C that generated motion signal 406 at sensor 304.

As shown in FIG. 4B, signal 408 may include a signal peak 409 having amplitude A3 occurring at a frequency F3, while signal 406 may include a signal peak 407 having an amplitude A4 occurring at a frequency F4. In accordance with the present disclosure, by analyzing signals 406 and/or 408, for example, by comparing signal peak 407 to signal peak 409, virtual button logic 307 may be adapted to associate location C with the impact that generated signals 406 and 408. For example, in accordance with some implementations, signals 406 and 408 may be analyzed to generate a differential amplitude value dA2 between peaks 409 and 407 and/or a differential frequency value dF2 between peaks 409 and 407 that may be used to identify location C.

In some implementations, motion signals may be vector signals conveying information regarding the direction of motion associated with an impact in addition to vector magnitude and/or frequency information associated with an impact. Thus, in some implementations, motion signals may be compared in terms of magnitude, frequency and/or direction in order to determine an impact location. For example, referring to FIG. 4A, in addition to a magnitude and frequency values, each of signals 402 and 404 may include a respective direction component D1 and D2 that may be used to determine a differential direction value dD1 that may, in turn, be used to identify a location associated with an impact. Similarly, referring to FIG. 4B, in addition to a magnitude and frequency values, each of signals 406 and 408 may include a respective direction component D3 and D4 that may be used to determine a differential direction value dD2 that may, in turn, be used to identify a location associated with an impact.

In the context of example device 300, analysis of motion signals received by motion sensors 302 and 304 may, in some implementations, be undertaken by virtual button logic 307 of processor 306 in conjunction with memory 308 where data indicative of motion signals received by sensors 302 and 304 may be provided to processor 306 and/or memory 308 via bus 310. For example, sensors 302 and 304 may generate data corresponding to motion signals where that data includes a series of frequency, amplitude and/or direction values, and motion sensors 302 and 304 may provide that data to processor 306 via bus 310. Processor 306 may then be arranged to use virtual button logic 307 to analyze that data to determine the location of the impact that generated the motion signals received by sensors 302 and 304. For example, processor 306 may be adapted to analyze the data received from sensors 302 and 304 to determine associated differential amplitude, differential frequency and/or differential direction values. In various implementations, virtual button logic 307 may be implemented in hardware, firmware, software or any combination thereof.

In some implementations, referring also to FIG. 1, processor 306 may be adapted to undertake block 104 of process 100 by analyzing motion signals received from sensors 302 and 304 to determine an indication of location of a physical impact on case 312 of device 300. When processor 306 does so it may analyze data received from motion sensors 302 and 304 to generate a characteristic associated with the data such as differential amplitude, differential frequency and/or differential direction values for each physical axis, and may compare that characteristic to a set of predetermined characteristics to determine a location of the corresponding physical impact on case 312. For example, processor 306 may be arranged to compare the determined characteristic such as differential amplitude, differential frequency and/or differential direction values to a set of predetermined characteristics where that set includes at least one characteristic corresponding to each location A-G. In this example, the predetermined characteristics may include a differential amplitude, differential frequency and/or differential direction value associated with each location A-G where each characteristic may have been established at some time prior to the undertaking of process 100 by tapping case 312 of device 300 at or near the corresponding location, detecting the resulting motion signal with sensors 302 and 304, and then analyzing motion data provided by the sensors (using, e.g., processor 306) to establish the characteristic value(s) associated with the particular location. The characteristic value or values may then be stored (in, for example, memory 308) for use in undertaking block 104.

In some implementations a device may employ a single motion sensor to provide virtual buttons in accordance with the present disclosure. For example, in some implementations, a device may employ a gyroscopic or "6-axis" motion sensor to determine the location of a physical impact imparted to the device in accordance with the present disclosure.

Figure 5:
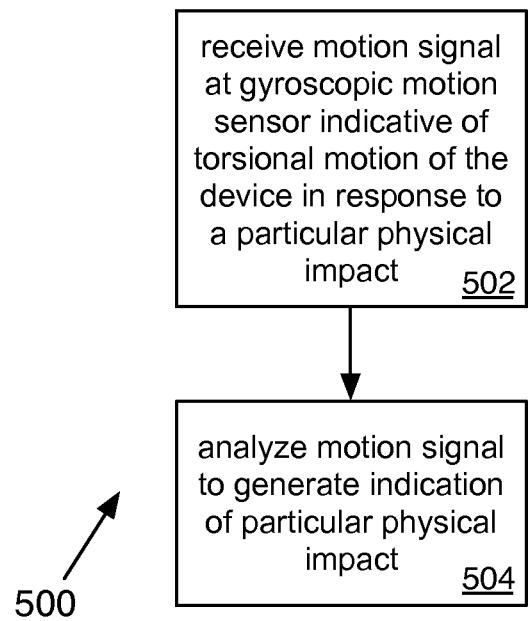
FIG. 5 is a flow chart illustrating another example process for providing virtual device buttons.

FIG. 5 is a flow chart illustrating an example process 500 for the simulation of virtual device buttons in accordance with the present disclosure. In some implementations, process 500 may be implemented in undertaking blocks 102 and/or 104 of process 100. Those skilled in the art in light of the present disclosure will recognize that numerous alternatives to the functional blocks shown in FIG. 5, and other processes described herein, may be practiced in accordance with claimed subject matter. Process 500 may include one or more of blocks 502 and/or 504. In block 502, process 500 may include receiving a motion signal at a gyroscopic motion sensor in a device where the motion signal may be indicative of torsional motion of a device in response to a particular physical impact incurred by the device. In block 504 the motion signal received in block 502 may be analyzed to generate an indication of the particular physical impact.

Figure 6:
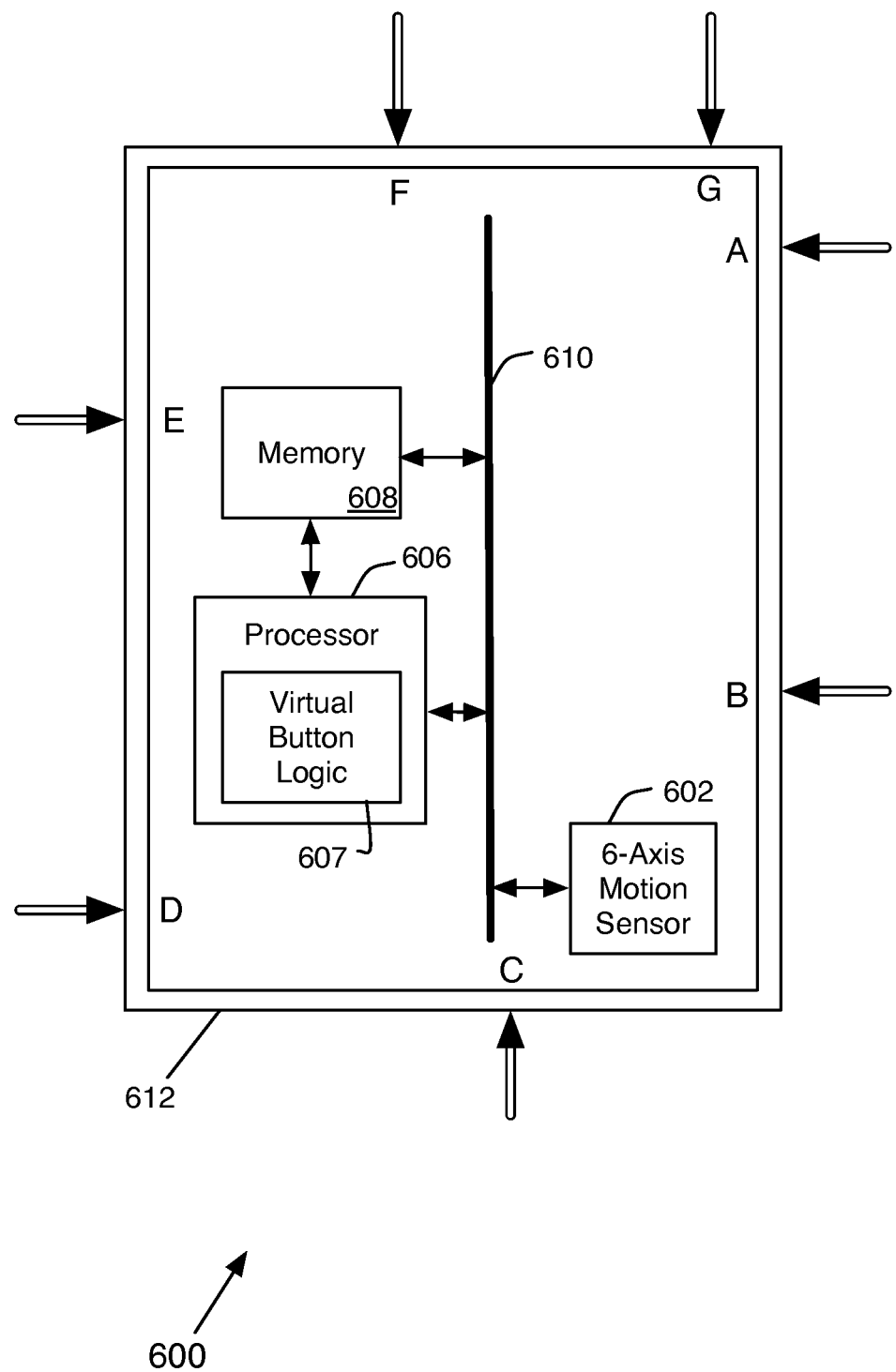
FIG. 6 is block diagram illustrating another example system that may be suitable for providing virtual device buttons.

FIG. 6 is a block diagram illustrating an example system or device 600 suitable for undertaking any one or all of the functional blocks of processes 100 and/or 500 in accordance with the present disclosure. Device 600 is presented herein as an example device useful for explaining the subject matter of processes 100 and 500, and claimed subject matter is not limited to the particular configuration of components illustrated in FIG. 6. Device 600 may include a 6-axis motion sensor (e.g., a gyroscopic motion sensor) 602 coupled to a processor 606 and a memory 608 via a bus 610. Processor 606 may include Virtual Button logic 607 suitable for implementing some or all of the functional blocks of processes 100 and/or 500. In various implementations, virtual button logic 607 may be implemented in hardware, firmware, software or any combination thereof. In some implementations, processor 606 and memory 608 may also be adapted to communicate directly with each other without using bus 610. Similarly, although not shown in FIG. 6, components 602-608 may be adapted to communicate with each other without the use of a communications bus such as bus 610.

Device 600 also includes a case 612 enclosing components 602-610 within device 600. In various implementations, device 600 may be a communications device such as a cellular telephone, a Personal Digital Assistant (PDA), etc., or may be a device such as portable game console, a navigational aid (e.g., a Global Positioning System (GPS) device), a portable computing device such as a laptop or tablet computer, a computer peripheral device such as a computer mouse, etc. Those of skill in the art, in light of the present disclosure, will appreciate how a gyroscopic or 6-axis motion sensor may be configured and how such a sensor may be used to detect motion of the sensor, or a device to which it is attached, with respect to the three physical translation axes and to rotational motion about those axes. Further, while device 600 illustrates discrete components 602-610, claimed subject matter is not limited in this regard and those of skill in the art, in light of the present disclosure will recognize that one or more of components 602-610 may be integrated into a single component, such as an SOC.

In the context of example device 600, analysis of a motion signal received by motion sensor 602 may, in some implementations, be undertaken by virtual button logic 607 of processor 606 in conjunction with memory 608 where data indicative of motion signals received by sensor 602 may be provided to processor 606 and/or memory 608 via bus 610. For example, sensor 602 may generate data corresponding to motion signals where that data includes a series of frequency, amplitude and/or direction values, and motion sensor 602 may provide that data to processor 606 via bus 610. Processor 606 may then analyze that data using virtual button logic 607 to determine the location of the impact that generated the motion signals received by sensor 602.

In some implementations, referring also to FIG. 1, processor 606 may be adapted to undertake block 104 of process 100 by analyzing motion signals received from sensor 602 to determine an indication of location of a physical impact on case 612 of device 600. When processor 606 does so it may analyze data received from motion sensor 602 to generate a characteristic associated with the data such as maximum amplitudes of the data for each physical axis, and may compare that characteristic to a set of predetermined characteristics to determine a location of the corresponding physical impact on case 612. For example, processor 606 may be arranged to compare the determined characteristic such as the amplitude values to a set of predetermined characteristics where that set includes characteristic amplitude values corresponding to a physical impact incurred at each location A-G. In this example, the predetermined characteristics may include relative vector amplitude values associated with each location A-G where each characteristic may have been established at some time prior to the undertaking of process 100 by tapping case 612 of device 600 at or near the corresponding location, detecting the resulting motion signal with sensor 602, and then analyzing motion data provided by the sensor (using, e.g., processor 606) to establish the characteristic values associated with the particular location. The characteristic values may then be stored (in, for example, memory 608) for use in undertaking block 104.

In some implementations a device may employ one or more motion sensors in combination with resonant structures to provide virtual buttons in accordance with the present disclosure. For example, in some implementations, a device may employ one or more 3-axis accelerometer motion sensors in combination with resonant structures incorporated into a device to determine the location of a physical impact imparted to the device in accordance with the present disclosure where the physical impact at that location causes a nearby resonant structure to vibrate at a characteristic frequency. The vibrating structure may then transfer the vibration through the device structure to the motion sensor or sensors. Further, in some implementations, a device may employ a single 6-axis gyroscopic motion sensor in combination with resonant structures incorporated into a device to determine the location of a physical impact imparted to the device in accordance with the present disclosure.

In accordance with the present disclosure the resonant structures may be selected such that different resonant structures placed at different locations in a device exhibit different characteristic frequencies. In this manner, a motion sensor or sensors may determine a location of a physical impact based, at least in part, on a characteristic frequency or frequencies detected by the sensor(s). In some implementations, the resonant structures may comprise springs incorporated into different locations in a device as will be explained in further detail below.

Figure 7:
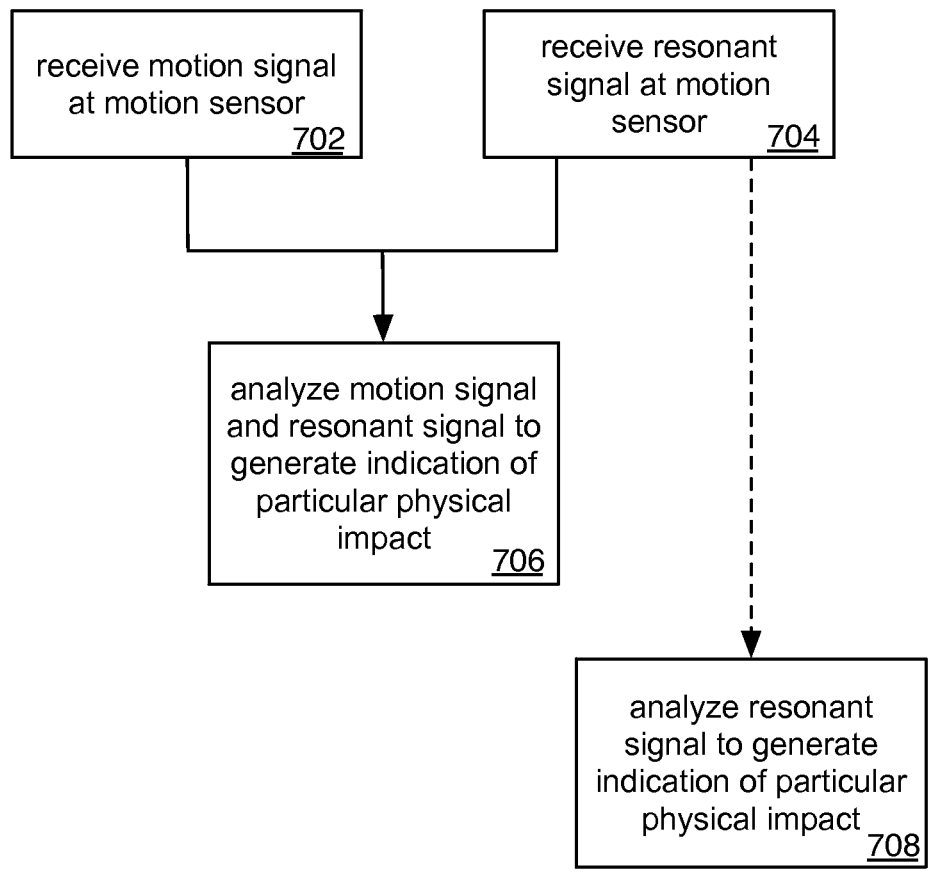
FIG. 7 is a flow chart illustrating another example process for providing virtual device buttons.

FIG. 7 is a flow chart illustrating an example process 700 for the simulation of virtual device buttons in accordance with the present disclosure. In some implementations, process 700 may be implemented when undertaking blocks 102 and/or 104 of process 100. Those skilled in the art in light of the present disclosure will recognize that numerous alternatives to the functional blocks shown in FIG. 7, and other processes described herein, may be practiced in accordance with claimed subject matter.

Process 700 may include one or more of blocks 702, 704, 706 and/or 708. In block 702, process 700 may include receiving a motion signal at a motion sensor in a device where the first signal is indicative of motion (torque and/or torsional) of a device in response to a particular physical impact incurred by the device. For example, block 702 may be undertaken in a similar manner to that discussed above with respect to block 202 of FIG. 2. In block 704, process 700 also may include receiving a resonant signal at the motion sensor where the resonant signal indicative of motion of a resonant structure within the device in response to a particular physical impact incurred by the device. For example, in some implementations, different resonant structures may be incorporated at different locations in a device, where each of the structures resonates at a different characteristic frequency. For example, multiple springs, the individual springs resonating at one of a range of frequencies (e.g., 2 kHz, 2.5 kHz, 3 kHz . . . 10 kHz) may be placed in different locations adjacent to a device's case. Hence, physical impacts such as finger taps delivered to different locations of the case may cause different ones of the structures to oscillate and impart different resonant frequencies to the device. The resonant frequencies may then be detected by the motion sensor(s) and subsequently used to determine the locations of the impacts based upon the predetermined locations of the resonant structures. Blocks 702 and 704 may be sequential operations or parallel operations.

In block 706, the motion signal and the resonant signal from blocks 702 and/or 704 may be analyzed to determine the location of a physical impact imparted to a device. Alternatively, in some implementations, in block 708, the resonant signal alone may be used to determine the location of a physical impact imparted to a device.

Figure 8:
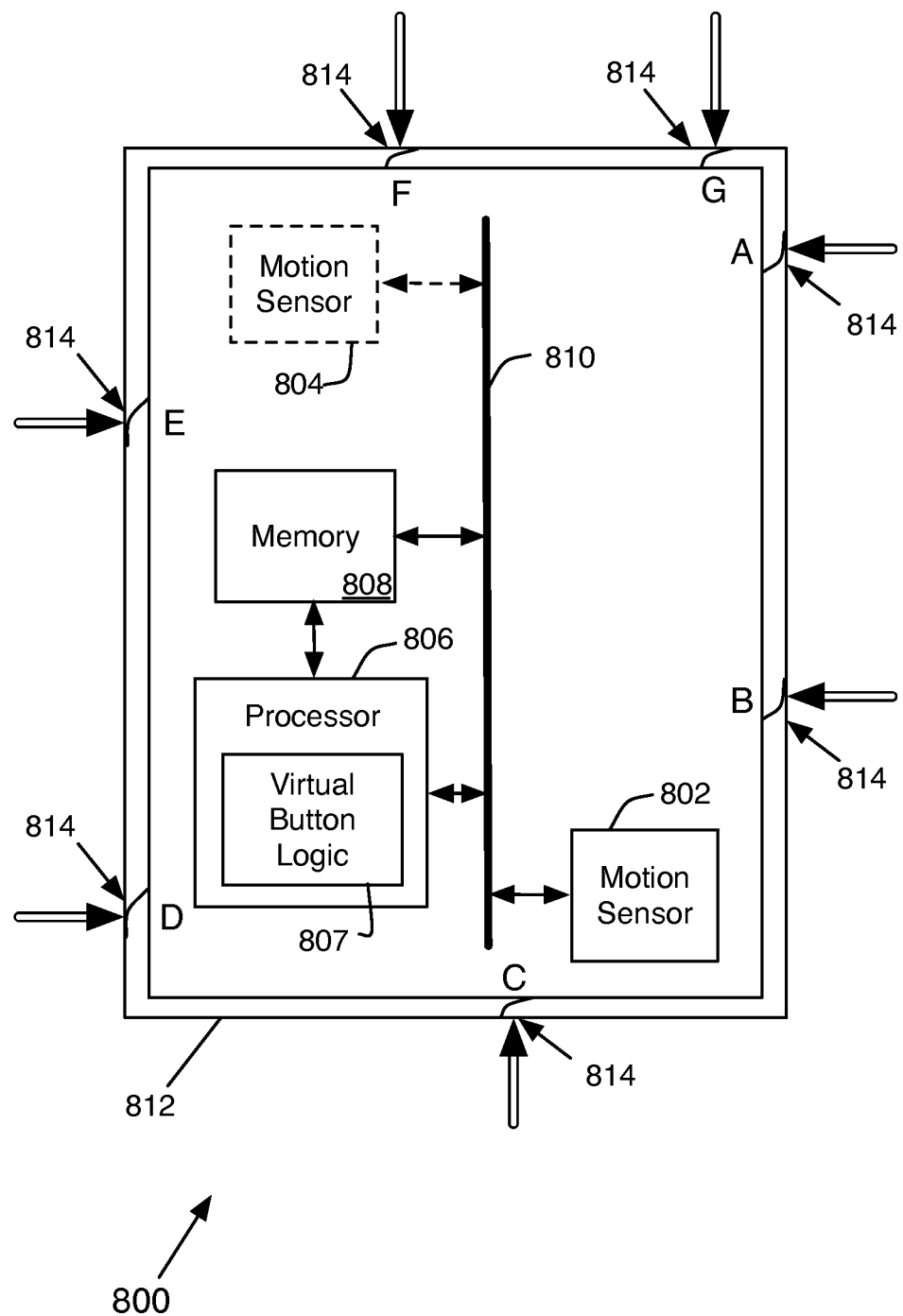
FIG. 8 is block diagram illustrating another example system that may be suitable for providing virtual device buttons.

FIG. 8 is a block diagram illustrating an example system or device 800 suitable for undertaking any one or all of the functional blocks of processes 100 and/or 700 in accordance with the present disclosure. Device 800 is presented herein as an example device useful for explaining the subject matter of processes 100 and 700, and claimed subject matter is not limited to the particular configuration of components illustrated in FIG. 8. Device 800 may include a motion sensor (e.g., a 3-axis or a 6-axis sensor) 802 coupled to a processor 806 and a memory 808 via a bus 810. Device 800 may, in some implementations, also include a second motion sensor 804 (e.g., a second 3-axis sensor). Processor 806 may include Virtual Button logic 807 suitable for implementing some or all of the functional blocks of processes 100 and/or 700. In various implementations, virtual button logic 807 may be implemented in hardware, firmware, software or any combination thereof.

Device 800 also includes a case 812 enclosing components 802-810 within device 800. In addition, Device 800 may also include resonant structures 814 distributed within device 800 adjacent to case 812 at or near locations A-G. In some implementations, each of the resonant structures 814 may vibrate at a different characteristic frequency. For example, the resonant structure adjacent to location A may vibrate at a characteristic frequency of 2 kHz, while the resonant structure adjacent to location G may vibrate at a characteristic frequency of 4 kHz. Hence, a physical impact such as a tap delivered to case 812 at or near location A may cause the adjacent resonant structure to vibrate at its characteristic frequency of 2 kHz, while a tap delivered to case 812 at or near location G may cause the adjacent resonant structure to vibrate at its characteristic frequency of 4 kHz. Hence sensor 802 and/or 804 may be arranged to detect the characteristic frequencies resonated by the structures adjacent to locations A and G and may provide corresponding data to logic 807 of processor 806. Further, the physical impacts at locations A and G may also generate motion signals indicating torque and/or torsional motion of device 800 that may be detected by sensor 802 and/or sensor 804 and provided to logic 807 in a manner similar to that described previously with respect to FIGS. 1-7.

Virtual Button Logic 807 may then be arranged to compare the motion data and/or the characteristic frequency data to predetermined characteristics in order to discriminate between a tap delivered to location A and a tap delivered to location G. In some implementations, virtual button logic 807 of processor 806 may implement block 708 of process 700 by comparing the characteristic frequency conveyed in the resonant signal received in block 704 to information specifying the characteristic frequencies associated with the different structures 814 in order to match the detected characteristic frequency with one of locations A-G. For example, if sensor 802 indicates to processor 806 that a 2 kHz frequency was detected then virtual button logic 807 may determine that device 800 had been tapped at location A. If, on the other hand, sensor 802 indicates to processor 806 that a 4 kHz frequency was detected then virtual button logic 807 may determine, for example, that device 800 had been tapped at location G.

In some implementations, as noted above, sensor 802 and/or 804 may provide motion data to processor 806 where that motion data includes both a resonant frequency data associated with a physical impact applied to device 800 adjacent to at least one of structures 814, and data indicating torque or torsional motion applied to device 800 by that impact. In implementations where device 800 may employ two 3-axis sensors 802 and 804, the data supplied to processor 806 indicating torque may include data specifying motion with respect to translation of device 800 with regard to the three physical translation axes and may include differential amplitude, differential frequency and/or differential direction values as described previously. In implementations where device 800 employs a single 6-axis sensor 802, the data supplied to processor 806 indicating torque may include data specifying motion with respect to translation of device 800 with regard to the three physical translation axes as well as rotation about those axes and may include vector amplitude values as described previously.

In some implementations, when implementing block 706 of process 700, virtual button logic 807 may be adapted to utilize both a motion signal received in block 702 and a resonant signal received in block 704. For example, if device 800 receives a physical impact at location A, virtual button logic 807 may be adapted to use both the corresponding motion signal and the resonant signal derived from the resonant structure adjacent to location A to determine that the tap occurred at location A rather than nearby location G.

In some implementations, information regarding predetermined characteristics for use in comparing to received motion data may be provided to processor 806 by software executing on device 800. In some implementations, information regarding predetermined characteristics may be stored in memory 808 for access by processor 806.

In various implementations, device 800 may be a communications device such as a cellular telephone, a Personal Digital Assistant (PDA), etc., or may be a device such as portable game console, a navigational aid (e.g., a Global Positioning System (GPS) device), a portable computing device such as a laptop or tablet computer, a computer peripheral device such as a computer mouse, etc. While device 800 illustrates discrete components 802-810, claimed subject matter is not limited in this regard and those of skill in the art, in light of the present disclosure will recognize that one or more of components 802-810 may be integrated into a single component, such as an SOC.

Referring again to FIG. 1, process 100 may conclude, in block 106, the invoking of a device function in response to the characteristic determined in block 104. In various implementations, for example, in the implementations described with respect to FIGS. 1-3 and 5-8, block 106 may include invoking any of a large variety of device functions in response to determining the location of a physical impact corresponding to the characteristic determined in block 104. For example, block 106 may involve hiding a current window displayed by a device when it has been determined that the device was tapped on an upper portion of the device's case, whereas block 106 may involve displaying a next page of text when it has been determined that the device was tapped on a right side portion of the device's case. Those skilled in the art, in light of the present disclosure, will recognize that a large variety of device functions may be invoked in undertaking block 106 and claimed subject matter is not limited to particular devices or device functions.

Figure 9:
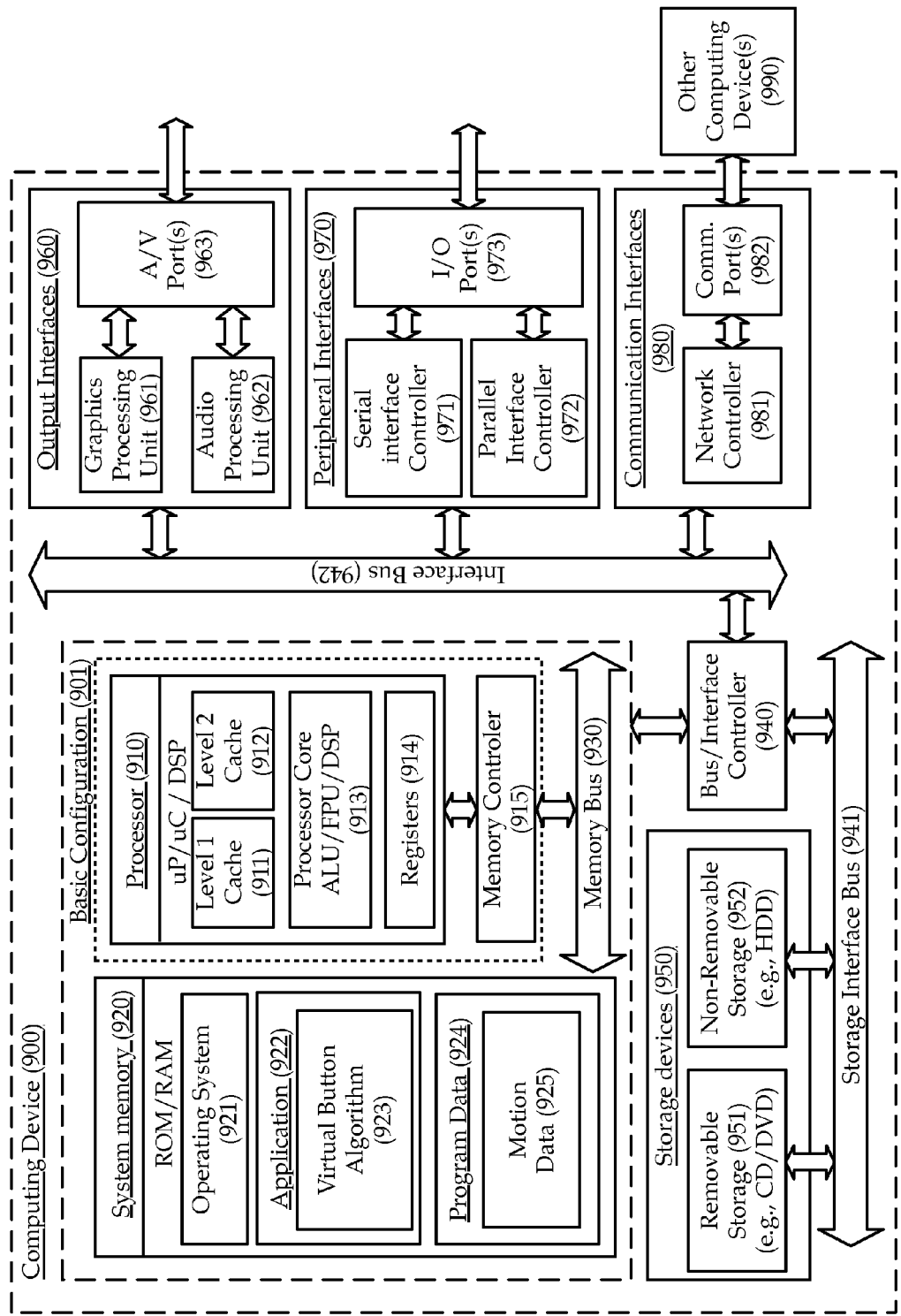
FIG. 9 is a block diagram illustrating an example computing device, all arranged in accordance with the present disclosure.
Figure 9:
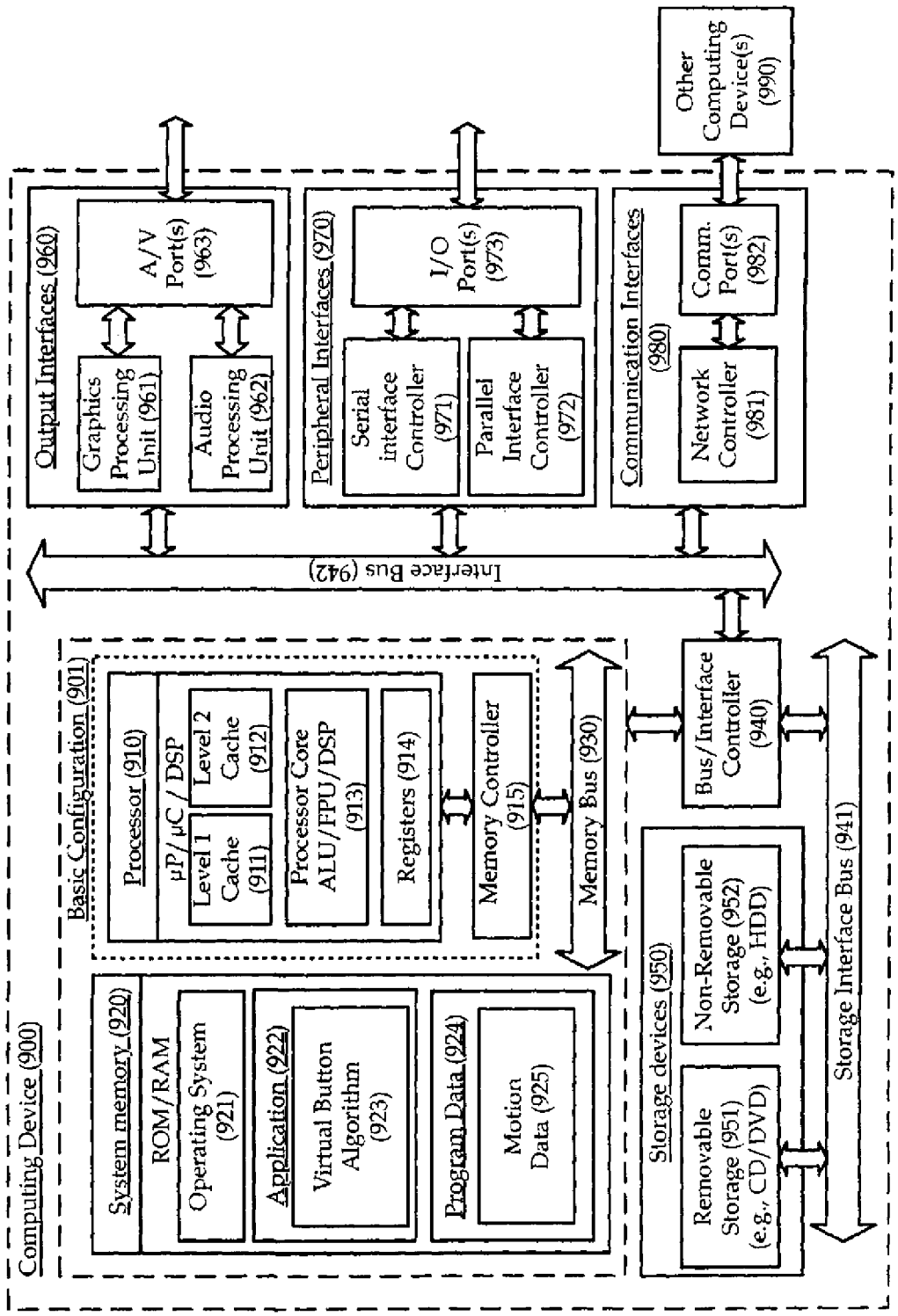

FIG. 9 is a block diagram illustrating an example computing device 900 that may be arranged for simulation of virtual buttons in accordance with the present disclosure. In a very basic configuration 901, computing device 900 may include one or more processors 910 and system memory 920. A memory bus 930 may be used for communicating between the processor 910 and the system memory 920.

Depending on the desired configuration, processor 910 may be of any type including but not limited to a microprocessor (μP), a microcontroller (μC), a digital signal processor (DSP), or any combination thereof. Processor 910 may include one or more levels of caching, such as a level one cache 911 and a level two cache 912, a processor core 913, and registers 914. The processor core 913 may include an arithmetic logic unit (ALU), a floating point unit (FPU), a digital signal processing core (DSP Core), or any combination thereof. A memory controller 915 may also be used with the processor 910, or in some implementations the memory controller 915 may be an internal part of the processor 910.

Depending on the desired configuration, the system memory 920 may be of any type including but not limited to volatile memory (such as RAM), non-volatile memory (such as ROM, flash memory, etc.) or any combination thereof. System memory 920 may include one or more of an operating system 921, one or more applications 922, and program data 924. Application 922 may include a virtual button algorithm 923 that may be arranged to perform the functions as described herein including the functional blocks described with respect to processes FIGS. 1-2, 5 and 7. Program Data 924 may include motion data 925, for example, time series of amplitude values, resonant frequency data, differential magnitude, frequency and/or direction values etc, which may be useful for implementing virtual button algorithm 923. In some example embodiments, application 922 may be arranged to operate with program data 924 on an operating system 921 such that implementations of simulation of virtual buttons may be provided as described herein. This described basic configuration is illustrated in FIG. 9 by those components within dashed line 901.

Computing device 900 may have additional features or functionality, and additional interfaces to facilitate communications between the basic configuration 901 and any required devices and interfaces. For example, a bus/interface controller 940 may be used to facilitate communications between the basic configuration 901 and one or more data storage devices 950 via a storage interface bus 941. The data storage devices 950 may be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of device 900.

Computing device 900 may also include an interface bus 942 for facilitating communication from various interface devices (e.g., output interfaces, peripheral interfaces, and communication interfaces) to the basic configuration 901 via the bus/interface controller 940. Example output interfaces 960 include a graphics processing unit 961 and an audio processing unit 962, which may be configured to communicate to various external devices such as a display or speakers via one or more A/V ports 963. Example peripheral interfaces 960 include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which may be arranged to facilitate communications with one or more other computing devices 990 over a network communication via one or more communication ports 982. A communication connection is one example of a communication media. Communication media may be embodied by computer readable instructions, data structures, program modules, or other data in a modulated data signal, such as a carrier wave or other transport mechanism, and includes any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 900 may also be implemented as a personal computer including both laptop computer and non-laptop computer configurations.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed:

1. A method for simulating virtual device buttons, the method comprising:
   receiving, via one or more motion sensors in a device, an indication of a particular physical impact incurred by the device, wherein receiving the indication of the particular physical impact comprises:
      receiving a first signal at a first motion sensor of the device;
      receiving a second signal at a second motion sensor of the device; and
      comparing the first signal to the second signal to generate the indication of the particular physical impact, wherein:
         the first and second signals comprise one or more of: first and second amplitude values, first and second frequency values and/or first and second direction values, and
         comparing the first signal to the second signal comprises one or more of: determining a differential frequency value from the first and second frequency values, determining a differential amplitude value from the first and second amplitude values and/or determining a differential direction value from the first and second direction values;
   determining whether the indication corresponds to one or more of a plurality of predetermined characteristics; and
   invoking a device function in response to determining that the indication corresponds to one or more of the plurality of predetermined characteristics,
   wherein the plurality of predetermined characteristics comprise indications associated with responses of the device to physical impacts incurred at different locations on the device.

2. The method of claim 1, wherein invoking the device function comprises simulating a function of a virtual device button.

3. The method of claim 1, wherein the indications associated with responses of the device to physical impacts incurred at different locations on the device comprise one or more of: a plurality of predetermined differential frequency values, a plurality of predetermined differential amplitude values, and/or a plurality of predetermined differential direction values.

4. The method of claim 1, wherein the first and second motion sensors comprise accelerometers.

5. The method of claim 1, wherein the particular physical impact incurred by the device comprises tapping of the device.

6. An apparatus configured to simulate virtual device buttons responsive to a physical impact incurred at a location, the apparatus comprising:
   an exterior case;
   a motion sensor disposed within the exterior case and arranged to generate a motion signal responsive to physical impact incurred by the exterior case, wherein the signal comprises a signal indicative of torsional motion of the exterior case, the motion sensor comprising a gyroscopic sensor and first and second accelerometers; and
   processing logic configured to:
      receive the motion signal from the motion sensor;
      evaluate the motion signal to determine the location of the physical impact incurred on the exterior case;
      receive a first signal from the first accelerometer;
      receive a second signal from the second accelerometer; and
      compare the first signal to the second signal to determine the location on the exterior case corresponding to the physical impact.

7. The apparatus of claim 6, wherein the signal indicative of torsional motion of the case comprises a signal indicative of a direction of torque placed on the device by the physical impact.

8. The apparatus of claim 6, wherein the physical impact comprises a tapping motion applied to the case.

9. The apparatus of claim 6, wherein the exterior case comprises an exterior case of a cellular telephone, a smart phone, a personal digital assistant, a tablet computer, a laptop computer, a personal music player, a portable gaming device, or a computer peripheral device.

10. An article comprising: a non-transitory computer program product having stored therein instructions that, if executed, result in:
   receiving, via one or more motion sensors in a device, an indication of a particular physical impact incurred by the device, the instructions for receiving the indication of the particular physical impact comprise instructions that, if executed, result in:
      receiving a first signal at a first motion sensor of the device;
      receiving a second signal at a second motion sensor of the device; and
      comparing the first signal to the second signal to generate the indication of the particular physical impact, wherein:
         the first and second signals comprise one or more of: first and second amplitude values, first and second frequency values and/or first and second direction values, and
         the instructions for comparing the first signal to the second signal comprise instructions that, if executed, result in one or more of: determining a differential frequency value from the first and second frequency values, determining a differential amplitude value from the first and second amplitude values and/or determining a differential direction value from the first and second direction values;
   determining whether the indication corresponds to one or more predetermined characteristics; and
   invoking a device function in response to determining that the indication corresponds to one of the predetermined characteristics,
   wherein the one or more predetermined characteristics comprise one or more indications associated with responses of the device to physical impacts incurred at different locations on the device.

11. The article of claim 10, wherein invoking the device function comprises simulating a function of a virtual device button.

12. The article of claim 10, wherein the indications associated with responses of the device to physical impacts incurred at different locations on the device comprise one or more of: a plurality of predetermined differential frequency values, a plurality of predetermined differential amplitude values, and/or a plurality of predetermined differential direction values.

13. A method for simulating virtual device buttons, the method comprising:
receiving, via one or more motion sensors in a device, an indication of a particular physical impact incurred by the device, wherein receiving the indication of the particular physical impact comprises:
receiving a first signal at a first motion sensor of the device;
receiving a second signal at a second motion sensor of the device; and
comparing the first signal to the second signal to generate the indication of the particular physical impact;
determining whether the indication corresponds to one or more of a plurality of predetermined characteristics; and
invoking a device function in response to determining that the indication corresponds to one or more of the plurality of predetermined characteristics,
wherein the plurality of predetermined characteristics comprise indications associated with responses of the device to physical impacts incurred at different locations on the device, wherein the indications associated with responses of the device to physical impacts incurred at different locations on the device comprise a plurality of torsional motion values corresponding to physical impacts incurred at different locations on the device.

14. The method of claim 13, wherein invoking the device function comprises simulating a function of a virtual device button.

15. The method of claim 13, wherein the first and second signals comprise one or more of: first and second amplitude values, first and second frequency values and/or first and second direction values.

16. The method of claim 15, wherein comparing the first signal to the second signal comprises one or more of: determining a differential frequency value from the first and second frequency values, determining a differential amplitude value from the first and second amplitude values and/or determining a differential direction value from the first and second direction values.

17. The method of claim 16, wherein the indications associated with responses of the device to physical impacts incurred at different locations on the device comprise one or more of: a plurality of predetermined differential frequency values, a plurality of predetermined differential amplitude values, and/or a plurality of predetermined differential direction values.

18. The method of claim 13, wherein the first and second motion sensors comprise accelerometers.

19. The method of claim 13, wherein the indications associated with responses of the device to physical impacts incurred at different locations on the device comprise a plurality of predetermined frequency values, each of the plurality of predetermined frequency values corresponding to physical impacts incurred at different locations on the device.

20. The method of claim 13, wherein the one or more motion sensors comprise a gyroscopic sensor, and wherein receiving the indication of the particular physical impact comprises receiving a signal at the gyroscopic sensor indicative of a torsional motion of the device in response to the particular physical impact.

21. The method of claim 20, wherein the signal indicative of a torsional motion of the device comprises a signal indicative of a direction of torque placed on the device by the particular physical impact.

22. The method of claim 13, wherein the particular physical impact incurred by the device comprises tapping of the device.

23. An apparatus configured to simulate virtual device buttons responsive to a physical impact incurred at a location, the apparatus comprising:
an exterior case;
a motion sensor disposed within the exterior case and arranged to generate a motion signal responsive to physical impact incurred by the exterior case;
a plurality of spring elements disposed at locations on the case, each of the plurality of spring elements having a different resonant frequency, wherein the motion signal received from the motion sensor comprises an indication of a resonant frequency; and
processing logic configured to:
receive the motion signal from the motion sensor;
evaluate the motion signal to determine the location of the physical impact incurred on the exterior case; and
determine the location on the exterior case corresponding to the physical impact by correlating the indication of the resonant frequency with one or more of the plurality of spring elements.

24. The apparatus of claim 23, wherein the motion sensor comprises a gyroscopic sensor, and wherein the signal comprises a signal indicative of torsional motion of the exterior case.

25. The apparatus of claim 24, wherein the signal indicative of torsional motion of the case comprises a signal indicative of a direction of torque placed on the device by the physical impact.

26. The apparatus of claim 23, wherein the physical impact comprises a tapping motion applied to the case.

27. The apparatus of claim 23, wherein the motion sensor comprises first and second accelerometers, and wherein the processing logic is further configured to:
receive a first signal from the first accelerometer;
receive a second signal from the second accelerometer; and
compare the first signal to the second signal to determine the location on the exterior case corresponding to the physical impact.

28. The apparatus of claim 23, wherein the exterior case comprises an exterior case of a cellular telephone, a smart phone, a personal digital assistant, a tablet computer, a laptop computer, a personal music player, a portable gaming device, or a computer peripheral device.

29. An article comprising: a non-transitory computer program product having stored therein instructions that, if executed, result in:
receiving, via one or more motion sensors in a device, an indication of a particular physical impact incurred by the device;
determining whether the indication corresponds to one or more predetermined characteristics; and
invoking a device function in response to determining that the indication corresponds to one of the predetermined characteristics,
wherein the one or more predetermined characteristics comprise one or more indications associated with responses of the device to physical impacts incurred at different locations on the device, wherein the one or more indications associated with responses of the device to physical impacts incurred at different locations on the device comprise a plurality of predetermined frequency values corresponding to physical impacts incurred at different locations on the device.

30. The article of claim 29, wherein invoking the device function comprises simulating a function of a virtual device button.

31. The article of claim 29, wherein the instructions for receiving the indication of the particular physical impact comprise instructions that, if executed, result in:
receiving a first signal at a first motion sensor of the device;
receiving a second signal at a second motion sensor of the device; and
comparing the first signal to the second signal to generate the indication of the particular physical impact.

32. The article of claim 31, wherein the first and second signals comprise one or more of: first and second amplitude values, first and second frequency values and/or first and second direction values.

33. The article of claim 32, wherein the instructions for comparing the first signal to the second signal comprise instructions that, if executed, result in one or more of: determining a differential frequency value from the first and second frequency values, determining a differential amplitude value from the first and second amplitude values and/or determining a differential direction value from the first and second direction values.

34. The article of claim 33, wherein the one or more indications associated with responses of the device to physical impacts incurred at different locations on the device comprise one or more of: a plurality of predetermined differential frequency values, a plurality of predetermined differential amplitude values, and/or a plurality of predetermined differential direction values.

35. The article of claim 29, wherein the one or more motion sensors comprise a gyroscopic sensor, and wherein the instructions for receiving the indication of the particular physical impact comprise instructions that, if executed, result in receiving a signal at the gyroscopic sensor indicative of a torsional motion of the device in response to the particular physical impact.

36. The article of claim 29, wherein the one or more indications associated with responses of the device to physical impacts incurred at different locations on the device comprise a plurality of torsional motion values corresponding to physical impacts incurred at different locations on the device.

37. An article comprising: a non-transitory computer program product having stored therein instructions that, if executed, result in:
receiving, via one or more motion sensors in a device, an indication of a particular physical impact incurred by the device, wherein the instructions for receiving the indication of the particular physical impact comprise instructions that, if executed, result in:
receiving a first signal at a first motion sensor of the device;
receiving a second signal at a second motion sensor of the device; and
comparing the first signal to the second signal to generate the indication of the particular physical impact;
determining whether the indication corresponds to one or more predetermined characteristics; and
invoking a device function in response to determining that the indication corresponds to one of the predetermined characteristics,
wherein the one or more predetermined characteristics comprise one or more indications associated with responses of the device to physical impacts incurred at different locations on the device, wherein the one or more indications associated with responses of the device to physical impacts incurred at different locations on the device comprise a plurality of torsional motion values corresponding to physical impacts incurred at different locations on the device.

38. The article of claim 37, wherein invoking the device function comprises simulating a function of a virtual device button.

39. The article of claim 37, wherein the first and second signals comprise one or more of: first and second amplitude values, first and second frequency values and/or first and second direction values.

40. The article of claim 39, wherein the instructions for comparing the first signal to the second signal comprise instructions that, if executed, result in one or more of: determining a differential frequency value from the first and second frequency values, determining a differential amplitude value from the first and second amplitude values and/or determining a differential direction value from the first and second direction values.

41. The article of claim 40, wherein the one or more indications associated with responses of the device to physical impacts incurred at different locations on the device comprise one or more of a plurality of predetermined differential frequency values, a plurality of predetermined differential amplitude values, and/or a plurality of predetermined differential direction values.

42. The article of claim 37, wherein the one or more indications associated with responses of the device to physical impacts incurred at different locations on the device comprise a plurality of predetermined frequency values corresponding to physical impacts incurred at different locations on the device.

43. The article of claim 37, wherein the one or more motion sensors comprise a gyroscopic sensor, and wherein the instructions for receiving the indication of the particular physical impact comprise instructions that, if executed, result in receiving a signal at the gyroscopic sensor indicative of a torsional motion of the device in response to the particular physical impact.

44. The article of claim 37, wherein the one or more indications associated with responses of the device to physical impacts incurred at different locations on the device comprise a plurality of torsional motion values corresponding to physical impacts incurred at different locations on the device.

45. A method for simulating virtual device buttons, the method comprising:
receiving, via one or more motion sensors in a device, an indication of a particular physical impact incurred by the device, wherein receiving the indication of the particular physical impact comprises:
receiving a first signal at a first motion sensor of the device;
receiving a second signal at a second motion sensor of the device; and
comparing the first signal to the second signal to generate the indication of the particular physical impact;
determining whether the indication corresponds to one or more of a plurality of predetermined characteristics; and
invoking a device function in response to determining that the indication corresponds to one or more of the plurality of predetermined characteristics, wherein the plurality of predetermined characteristics comprise indications associated with responses of the device to physical impacts incurred at different locations on the device, wherein the indications associated with responses of the device to physical impacts incurred at different locations on the device comprise a plurality of predetermined frequency values, each of the plurality of predetermined frequency values corresponding to physical impacts incurred at different locations on the device.

46. The method of claim 45, wherein invoking the device function comprises simulating a function of a virtual device button.

47. The method of claim 45, wherein the first and second motion sensors comprise accelerometers.

48. The method of claim 45, wherein the particular physical impact incurred by the device comprises tapping of the device.

49. A method for simulating virtual device buttons, the method comprising:
   receiving, via one or more motion sensors in a device including a gyroscopic sensor, an indication of a particular physical impact incurred by the device, wherein receiving the indication of the particular physical impact comprises:
      receiving a signal at the gyroscopic sensor indicative of a torsional motion of the device in response to the particular physical impact;
      receiving a first signal at a first motion sensor of the device;
      receiving a second signal at a second motion sensor of the device; and
      comparing the first signal to the second signal to generate the indication of the particular physical impact;
   determining whether the indication corresponds to one or more of a plurality of predetermined characteristics; and
   invoking a device function in response to determining that the indication corresponds to one or more of the plurality of predetermined characteristics,
   wherein the plurality of predetermined characteristics comprise indications associated with responses of the device to physical impacts incurred at different locations on the device.

50. The method of claim 49, wherein invoking the device function comprises simulating a function of a virtual device button.

51. The method of claim 49, wherein the first and second motion sensors comprise accelerometers.

52. The method of claim 49, wherein the signal indicative of a torsional motion of the device comprises a signal indicative of a direction of torque placed on the device by the particular physical impact.

53. The method of claim 49, wherein the particular physical impact incurred by the device comprises tapping of the device.

54. An article comprising: a non-transitory computer program product having stored therein instructions that, if executed, result in:
   receiving, via one or more motion sensors in a device including a gyroscopic sensor, an indication of a particular physical impact incurred by the device, the instructions for receiving the indication of the particular physical impact comprise instructions that, if executed, result in:
      receiving a signal at the gyroscopic sensor indicative of a torsional motion of the device in response to the particular physical impact;
      receiving a first signal at a first motion sensor of the device;
      receiving a second signal at a second motion sensor of the device; and
      comparing the first signal to the second signal to generate the indication of the particular physical impact;
   determining whether the indication corresponds to one or more predetermined characteristics; and
   invoking a device function in response to determining that the indication corresponds to one of the predetermined characteristics,
   wherein the one or more predetermined characteristics comprise one or more indications associated with responses of the device to physical impacts incurred at different locations on the device.

55. The article of claim 54, wherein invoking the device function comprises simulating a function of a virtual device button.

* * * * *

UNITED STATES PATENT AND TRADEMARK OFFICE
CERTIFICATE OF CORRECTION

PATENT NO. : 8,537,110 B2
APPLICATION NO. : 12/508831
DATED : September 17, 2013
INVENTOR(S) : Kruglick It is certified that error appears in the above-identified patent and that said Letters Patent is hereby corrected as shown below:

In the Drawings

In Fig. 9, Sheet 8 of 8, delete "uP/uC/DSP" and insert -- µP/µC/DSP --, therefor, see attached page 2, Fig. 9.

In Fig. 9, Sheet 8 of 8, in Box "(915)", in Line 1, delete "Controler" and insert -- Controller --, therefor, see attached page 2, Fig. 9.

In the Specification

In Column 1, Line 42, delete "is block" and insert -- is a block --, therefor.

In Column 1, Line 47, delete "is block" and insert -- is a block --, therefor.

In Column 1, Line 51, delete "is block" and insert -- is a block --, therefor.

In Column 11, Lines 41-42, delete "interfaces 960" and insert -- interfaces 970 --, therefor.

In Column 13, Line 33, delete "and or" and insert -- and/or --, therefor.

Signed and Sealed this
Twenty-second Day of April, 2014

Michelle K. Lee
*Deputy Director of the United States Patent and Trademark Office*